US009525191B2

(12) United States Patent
Liu et al.

(10) Patent No.: US 9,525,191 B2
(45) Date of Patent: Dec. 20, 2016

(54) MAGNESIUM-BASED ENERGY STORAGE SYSTEMS AND METHODS HAVING IMPROVED ELECTROLYTES

(71) Applicant: BATTELLE MEMORIAL INSTITUTE, Richland, WA (US)

(72) Inventors: Tianbiao Liu, Richland, WA (US); Guosheng Li, Richland, WA (US); Jun Liu, Richland, WA (US); Yuyan Shao, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 243 days.

(21) Appl. No.: 14/084,075

(22) Filed: Nov. 19, 2013

(65) Prior Publication Data

US 2014/0302404 A1 Oct. 9, 2014

Related U.S. Application Data

(63) Continuation-in-part of application No. 13/937,515, filed on Jul. 9, 2013, which is a continuation-in-part of application No. 13/858,764, filed on Apr. 8, 2013, now Pat. No. 9,112,243.

(51) Int. Cl.
H01M 10/054 (2010.01)
H01M 10/0568 (2010.01)

(52) U.S. Cl.
CPC ....... *H01M 10/0568* (2013.01); *H01M 10/054* (2013.01)

(58) Field of Classification Search
None
See application file for complete search history.

(56) References Cited

U.S. PATENT DOCUMENTS

| 8,318,354 | B2 | 11/2012 | Muldoon et al. |
| 8,354,193 | B2 | 1/2013 | Muldoon et al. |
| 2001/0049060 | A1 | 12/2001 | Aurbach et al. |
| 2008/0182176 | A1 | 7/2008 | Aurbach et al. |
| 2010/0136438 | A1 | 6/2010 | Nakayama et al. |

(Continued)

OTHER PUBLICATIONS

STIC Search Report on Monocation of Claim 1.*

(Continued)

*Primary Examiner* — Jonathan G Leong
*Assistant Examiner* — Haroon S Sheikh
(74) *Attorney, Agent, or Firm* — Klarquist Sparkman, LLP

(57) ABSTRACT

Electrolytes for Mg-based energy storage devices can be formed from non-nucleophilic $Mg^{2+}$ sources to provide outstanding electrochemical performance and improved electrophilic susceptibility compared to electrolytes employing nucleophilic sources. The instant electrolytes are characterized by high oxidation stability (up to 3.4 V vs Mg), improved electrophile compatibility and electrochemical reversibility (up to 100% coulombic efficiency). Synthesis of the $Mg^{2+}$ electrolytes utilizes inexpensive and safe magnesium dihalides as non-nucleophilic $Mg^{2+}$ sources in combination with Lewis acids, $MR_aX_{3-a}$ (for $3 \geq a \geq 1$). Furthermore, addition of free-halide-anion donors can improve the coulombic efficiency of Mg electrolytes from nucleophilic or non-nucleophilic $Mg^{2+}$ sources.

23 Claims, 12 Drawing Sheets

(56) References Cited

U.S. PATENT DOCUMENTS

2013/0034780 A1    2/2013    Muldoon et al.

OTHER PUBLICATIONS

Abe, Takeshi, et al., "Fabrication of ether-based electrolyte solutions for Mg-rechargeable batteries," Abstract #464, 224th ECS Meeting, 2013, The ELectrochemical Society, Japan.
Yasui, Ryohei, et al., Eectochemical Deposition and Dissoluton of Magnesium Metal in Various Ether-based Electrolytes, Abstract #463, 224th ECS Meeting, 2013, The Electrochemical Society, Japan.
Levi, Yu. Viestfrid, M.D., et al., "Microelectrode studies of reversible Mg deposition in THF solutions containing complexes of alkylaluminum chlorides and dialkylmagnesium," Journal of Electroanalytical Chemistry, vol. 576, pp. 183-195, 2005, Elsevier, Israel.
International Search Report/Written Opinion for International Application No. PCT/US2014/013371, International Filing Date, Jan. 28, 2014, Date of Mailing May 13, 2014.

\* cited by examiner

MAGNESIUM-BASED ENERGY STORAGE SYSTEMS AND METHODS HAVING IMPROVED ELECTROLYTES

CROSS-REFERENCE TO RELATED APPLICATIONS

This invention claims priority from and is a continuation in part of currently pending U.S. patent application Ser. No. 13/937,515, filed Jul. 9, 2013, which is a continuation in part of U.S. patent application Ser. No. 13/858,764, filed Apr. 8, 2013. The related applications are incorporated herein by reference.

STATEMENT REGARDING FEDERALLY SPONSORED RESEARCH OR DEVELOPMENT

This invention was made with government support under Contract DE-AC05-76RL01830, awarded by the U.S. Department of Energy. The government has certain rights in the invention.

BACKGROUND

Battery systems with low cost, high energy density, safe operation and long cycling life time have been sought after as viable technologies for storing sustainable energy and have also been greatly desired to meet increasing demands of powering portable devices and electric vehicles (EVs). In this regard, advanced rechargeable batteries can help to reduce the use of fossil fuels and the emission of $CO_2$. Recently, Mg batteries have attracted increasing attention as a promising high energy density battery technology and alternative to lithium-based batteries for grid scale energy storage, portable devices, and transportation applications.

Magnesium as an anode material inherently possesses a number of benefits. It is relatively safe to use without jeopardous dendrite formation. It is earth abundant, relatively low in cost, and has a high volumetric capacity (3832 AWL) due to the divalent nature of the $Mg^{2+/0}$ redox couple. However, the lack of practical, high-performance $Mg^{2+}$ electrolytes has been a primary technical hurdle to the development of practical $Mg^{2+}$ batteries. Unlike $Li^+$ salts, simple $Mg^{2+}$ salts (e.g. $MgCl_2$, $Mg(ClO_4)_2$, $MgTFSI_2$, $MgSO_4$ etc.) in organic solvents are not electrochemically active for $Mg^+$ plating and stripping because of the formation of passivation films on electrode surfaces.

The current methods for preparing $Mg^{2+}$ electrolytes involve the use of nucleophilic sources and/or Grignard reagents (or analogues like $RMgCl$ and $MgR_2$). However, these nucleophilic sources and Grignard reagents are difficult because they are highly reactive and because employing them for synthesis of $Mg^{2+}$ electrolytes is complex and can result in low yields. Furthermore, their presence can limit oxidation stability of the $Mg^{2+}$ electrolyte. Further still, the highly reactive chemicals can have limited compatibility with electrophiles such as high capacity cathodes (e.g., sulfur cathodes) and related electrolyte additives.

As an example of these disadvantages associated with the presence of these nucleophilic species, poor oxidation stability and undesired nucleophilicity of the resulting electrolytes is due to incomplete reactions and/or byproduct formation (i.e. $MgR_2$ generated from $RMgCl$. Electrolytes using $RMgCl$ or $MgR_2$ are precluded from being included in high energy density Mg batteries with sulfur cathode (i.e., electrophilic) materials because of the formation of disulfide species.

$Mg(BH_4)_2$ and $Mg(BPh_4)_2$ have also been considered as active $Mg^{2+}$ electrolytes. However, low oxidation stability or insufficient coulombic efficiency of these mono-component electrolytes limits their practical application. Accordingly, a need exists for improved electrolytes for Mg-based energy systems and methods for synthesizing such electrolytes.

SUMMARY

This document describes conductive electrolytes for Mg-based energy storage systems as well as methods for synthesizing the electrolytes from relatively inexpensive, non-nucleophilic $Mg^{2+}$ sources. The electrolytes described herein exhibit outstanding electrochemical performance and improved electrophilic susceptibility compared to electrolytes employing nucleophilic $RMgCl$ or $MgR_2$. They are characterized by high oxidation stability (up to 3.4 V vs Mg), improved electrophile compatibility and electrochemical reversibility (up to 100% coulombic efficiency). Synthesis of the $Mg^{2+}$ electrolytes utilizes inexpensive and safe magnesium dihalides as non-nucleophilic $Mg^{2+}$ sources in combination with Lewis acids. The Lewis acids comprise supporting ligands that can significantly enhance the solubility of the $MgCl_2$. Also described are electrolytes that further comprise free-halide-anion donors, which can improve the coulombic efficiency.

In one embodiment, a Mg-based energy storage system having an anode comprising Mg metal is characterized by an electrochemical window greater than 2.8V vs. Mg and by an electrolyte solution comprising an organic solvent and an active $Mg^{2+}$ dimer monocation concentration greater than or equal to 0.2 M, wherein at least a portion of the active $Mg^{2+}$ dimer monocation concentration is a reaction product of a magnesium dihalide and a Lewis acid. The reaction can, for example, be a transmetalation reaction. The magnesium dihalide is represented as $MgX_2$ (wherein X represents a halogen element) and comprises a $Mg^{2+}$ source and a Lewis base donor (i.e., X). The Lewis acid has a formula $MR_aX_{3-a}$ ($3 \geq a \geq 1$), wherein M represents a metal center, R is an organic ligand, and X is the halogen element. In preferred embodiments, the molar ratio between the magnesium dihalide and the Lewis acid is approximately 2:1. In most instances, the Mg-based energy storage systems described herein can exhibit a Coulombic efficiency greater than 99%.

Examples of X can include, but are not limited to, Cl, Br, F, I, and combinations thereof. In preferred embodiments, the magnesium dihalide comprises $MgCl_2$ or $MgBr_2$.

Examples of M can include, but are not limited to B, Al, Ga, In, Fe, and combinations thereof. The organic ligands, R, can include, but are not limited to organic moieties such as alkyl, aryl, alkoxide, aryloxide, thiolate and amide, and combinations thereof. In some embodiments, the Lewis acid can include, but is not limited to, $MX_2R$, $MXR_2$, $MR_3$, and any combination thereof. In view of the above, some instances of the Lewis acid can include, but are not limited to, $AlCl_2Et$, $AlCl_2Ph$, $AlF_2Et$, $AlF_2Ph$, $GaCl_2Et$, $GaCl_2Ph$, $BBr_2Et$, and $BBr_2Ph$. Preferably, the halogen element of the Lewis acid is the same as the halogen element of the magnesium dihalide.

In preferred embodiments, the organic solvent is an ether solvent. Examples of ether solventes can include, but are not limited to, dimethyl ether (DME), diglyme, triglyme, tetraglyme and tetrahydrofuran (THF).

The supporting ligand of the Lewis acid contributes to unexpected results. The supporting ligand can significantly increase the solubility of the $Mg^{2+}$ active species. For example, Lewis acids having the formula $MR_aX_{3-a}$ (3≥a≥1) result in much higher concentrations of the active $Mg^{2+}$ dimer monocations compared to Lewis acids having the formula $MX_3$. Accordingly, embodiments of the present invention, which employ $MR_aX_{3-a}$ (3≥a≥1), exhibit much higher performance, coulombic efficiency and current densities compared to systems and methods utilizing conventional electrolyte compositions. In one embodiment, the active $Mg^{2+}$ dimer monocation concentration is greater than or equal to 0.4 M. In another embodiment, the concentration is greater than or equal to 0.7 M.

In some instances, a free-halide-anion donor comprising $X^-$, but not Mg, can contribute free anions of $X^-$ to the electrolyte solution. Rather than Mg, the free-halide-anion donor can be an organic salt having $X^-$ or an inorganic salt having X. Examples of organic salts having $X^-$ can include, but are not limited to tetraalklylammonium halides, bis (triphenylphosphine)iminium halides, imidazolium halides, and combinations thereof. Examples of inorganic salts having $X^-$ but not Mg can include, but are not limited to, Li halides, Na halides, K halides, and combinations thereof. Preferably, the halogen element of the free-halide-anion donor is the same as the halogen element of the magnesium dihalide and the Lewis acid.

Another embodiment encompasses a Mg-based energy storage system having an anode comprising Mg metal and is characterized by an electrochemical window greater than 2.8V vs. Mg and by an electrolyte solution comprising an organic solvent and reaction products of a magnesium dihalide and a Lewis acid. The magnesium dihalide has a formula $MgCl_2$ or $MgBr_2$. The Lewis acid has a metal center (M) comprising Al or Ga and a supporting ligand comprising $Cl^-$ or $Br^-$, respectively. The electrolyte solution further comprises a salt contributing free anions of $Cl^-$ or $Br^-$, respectively, to the electrolyte solution. The salt does not comprise Mg.

Another embodiment encompasses a Mg-based energy storage system having an anode comprising Mg metal and is characterized by an electrolyte solution comprising an organic solvent and reaction products of Mg compound and a Lewis acid. The Mg compound comprises Mg and a halogen element (X). The Lewis acid has a metal center (M) and a supporting ligand comprising a halide (X), an organic ligand (R), or both. The electrolyte solution further has a free-halide-anion donor comprising X, but not Mg, wherein the free-halide anion donor contributes free anions of $X^-$ to the electrolyte solution. In preferred embodiments, the Mg-based energy storage system has a coulombic efficiency greater than 99%.

In some instances, the free-halide-anion donor can be an organic salt having $X^-$ or an inorganic salt having X. Examples of organic salts having $X^-$ can include, but are not limited to tetraalkylammonium halides, bis(triphenylphosphine)iminium halides, imidazolium halides, and combinations thereof. Examples of inorganic salts having $X^-$ but not Mg can include, but are not limited to, Li halides, Na halides, K halides, and combinations thereof.

Yet another embodiment encompasses a method for improving Coulombic efficiency of Mg-based energy storage systems having an anode comprising Mg metal. The method comprises providing an electrolyte solution that comprises an organic solvent and reaction products of a Mg compound and a Lewis acid. The Mg compound has Mg and a halogen element (X). The Lewis acid has a metal center (M) and a supporting ligand comprising a halide ($X^-$), and organic ligand (R), or both. The method further comprises providing a free-halide-anion donor having X, but not Mg.

The free-halide-anion donor contributes free anions of $X^-$ to the electrolyte solution. In preferred embodiments, the step of providing a free-halide-anion donor comprises providing an amount of the free-halide-anion donor sufficient to yield a Coulombic efficiency greater than 99%.

Examples of the metal center (M) of the Lewis acid can include, but are not limited to B, Al, Ga, In, Fe, and combinations thereof. Examples of X in the Mg compound and the Lewis acid can include, but are not limited to, Br, Cl, F, I, and combinations thereof. In a preferred embodiment, at least some of the Lewis acid comprises $MR_aX_{3-a}$ (3≥a≥1).

In one instance, the Mg compound comprises $MgX_2$ and the Mg-based energy storage system has an electrochemical window greater than 2.8 V vs. Mg.

The purpose of the foregoing summary is to enable the United States Patent and Trademark Office and the public generally, especially the scientists, engineers, and practitioners in the art who are not familiar with patent or legal terms or phraseology, to determine quickly from a cursory inspection the nature and essence of the technical disclosure of the application. The summary is neither intended to define the invention of the application, which is measured by the claims, nor is it intended to be limiting as to the scope of the invention in any way.

Various advantages and novel features of the present invention are described herein and will become further readily apparent to those skilled in this art from the following detailed description. In the preceding and following descriptions, the various embodiments, including the preferred embodiments, have been shown and described. Included herein is a description of the best mode contemplated for carrying out the invention. As will be realized, the invention is capable of modification in various respects without departing from the invention. Accordingly, the drawings and description of the preferred embodiments set forth hereafter are to be regarded as illustrative in nature, and not as restrictive.

DESCRIPTION OF DRAWINGS

Embodiments of the invention are described below with reference to the following accompanying drawings.

DETAILED DESCRIPTION

The following description includes the preferred best mode of one embodiment of the present invention. It will be clear from this description of the invention that the invention is not limited to these illustrated embodiments but that the invention also includes a variety of modifications and embodiments thereto. Therefore the present description should be seen as illustrative and not limiting. While the invention is susceptible of various modifications and alternative constructions, it should be understood, that there is no intention to limit the invention to the specific form disclosed, but, on the contrary, the invention is to cover all modifications, alternative constructions, and equivalents falling within the spirit and scope of the invention as defined in the claims.

Figure 2A:
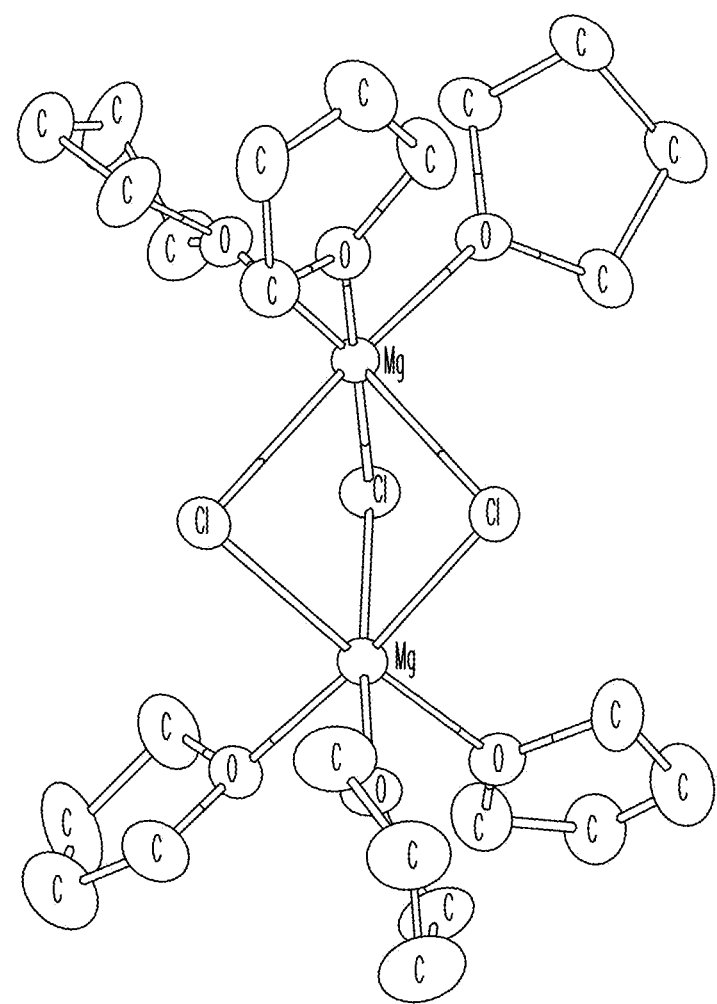
FIGS. 2A and 2B include illustrations depicting a comparison of the molecular structures of $[(\mu\text{-Cl})_3Mg_2(THF)_6]AlCl_4$ and $[(\mu\text{-Cl})_3Mg_2(THF)_6]AlPh_3Cl$, respectively.

The reaction products of a Lewis acid with magnesium compounds or magnesium dihalides, and/or the solvent can result in $Mg^{2+}$ dimer monocations solvated by the solvent of the electrolyte solution. For instance, one THF-solvated $Mg^{2+}$ dimer monocation, $[(\mu\text{-}Cl)_3Mg_2(THF)_6]^+$ (see FIG. 2A) has previously been identified in recrystallized products of electrochemically active Grignard reagents and electrolytes derived from Grignard reagents (or $MgR_2$) with Al-based Lewis acids in THF. Such $Mg^{2+}$ dimer salts have been shown to be electrochemically active for $Mg^{2+}$ cycling.

The dimer salt is believed to be a significant contributor to electrochemical activity. However, previously described systems typically contain very little of the solvated $Mg^{2+}$ dimer monocations. The low yield is believed to be due to competing side reactions when using a nucleophilic $Mg^{2+}$ source or Grignard reagent. In contrast, embodiments of the present invention contain significantly higher concentrations of the $Mg^{2+}$ dimer monocations and, furthermore, are free of nucleophilic $Mg^{2+}$ species. The increased concentration of the $Mg^{2+}$ dimer monocations can be attributed to the presence of the $MR_aX_{3-a}$ (3≥a≥1) Lewis acid and/or other features of embodiments of the present invention as described herein.

Regarding the structure and composition of $[(\mu\text{-}Cl)_3Mg_2(THF)_6]AlR_xCl_{4-x}$ (x=0-3, R=alkyl or aryl group), the dimer salts can be deconvoluted into three simple synthons: two equivalents of $MgCl_2$, six equivalents of THF solvent molecules and one equivalent of an Al Lewis acid, $AlR_xCl_{3-x}$ (see equation 1).

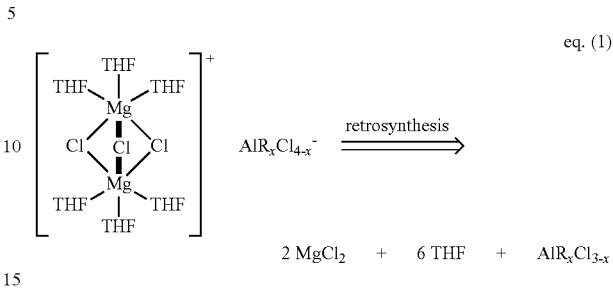

According to aspects of the present invention, the straightforward retrosynthesis analysis suggested that the dimer salts could be prepared, for example, using two equivalents of a magnesium dihalide (e.g., $MgCl_2$) and one equivalent of a Lewis acid in an ether solvent (e.g., THF). For example, according to equation 1, two equivalents of $MgCl_2$ transfer one $Cl^-$ to the Lewis acid and the resulting $Mg_2Cl_3$ core can complex with 6 THF molecules to form the target $[(\mu\text{-}Cl)_3Mg_2(THF)_6]^+$ cation. Accordingly, in some embodiments, the molar ratio of the magnesium dihalide to the Lewis acid is approximately 2:1. The ratio may deviate slightly from 2:1 due to measurement limitations and/or impurities within the reagents. Regardless of the ratio, the approach described herein intrinsically circumvents the use of the nucleophilic $Mg^{2+}$ starting materials, RMgCl or $MgR_2$. Instead, magnesium dihalides can be used. Furthermore, the absence of nucleophilic $Mg^{2+}$ starting materials in the resulting electrolytes leads to improved electrochemical performance and electrophilic susceptibility. The use of the $MR_aX_{3-a}$ (3≥a≥1) Lewis acid, results unexpectedly in significantly higher solubility and yield of the $Mg^{2+}$ dimer cation than previously demonstrated using $AlCl_3$.

While a magnesium dihalide has been tested as a $Mg^{2+}$ source for $Mg^{2+}$ plating and stripping with $AlCl_3$, it was quickly dismissed due to the poor performance and very low solubility. The synthetic approach of the instant embodiments is referred to herein as "mono-chloride abstraction" and it can yield a series of the $Mg^{2+}$ dimer electrolytes characteristic of exceptional oxidation stability (up to 3.4 V vs Mg), improved electrophilic susceptibility, high current density (up to 32.7 $mA/cm^2$) and reversible $Mg^{2+}$ ion plating and stripping (up to 100% Coulombic efficiency). Electrolytes described in some embodiments herein are experimentally established to be sulfur compatible and can be utilized in Mg—S batteries. Compared to previously reported formulations, the embodiments described herein are much more synthetically feasible and effective in terms of the cost of the starting materials, purification requirements, waste management, yield, and electrochemical performance of the produced electrolytes. In general, the approach can be widely applied to produce $Mg^{2+}$ electrolytes with desired chemical and physical characters for $Mg^{2+}$ batteries and Mg-plating applications.

Three different electrolyte systems ($MgCl_2$—$AlCl_3$, $MgCl_2$—$AlPh_3$, and $MgCl_2$—$AlEtCl_2$) in THF have been characterized and compared by multinuclear NMR ($^1H$, $^{27}Al\{^1H\}$ and $^{25}Mg\{^1H\}$) spectroscopies and electrochemical analysis.

All synthesis reactions and manipulations were performed under Ar using a glovebox. Solvents were pre-purged with $N_2$ and were dried using an activated alumina column and stored under Ar. All reagents were used as received. MgCl$_2$, AlEtCl$_2$, AlPh$_3$, AlCl$_3$, MoS$_2$, CuS, and Mo were purchased from ALDRICH Chemical Company.

Single crystal X-ray diffraction and NMR studies consistently established molecular structures of three electrolytes sharing a common Mg$^{2+}$-dimer mono-cation, [(μ-Cl)$_3$Mg$_2$(THF)$_6$]$^+$, along with an anion (AlCl$_4^-$, AlPh$_3$Cl$^-$ and AlEtCl$_3^-$ respectively). Clean Mg$^{2+}$ plating and viable battery performances were validated through the representative studies using an MgCl$_2$—AlEtCl$_2$ electrolyte. $^1$H and $^{27}$Al{$^1$H} NMR spectra were recorded on a Varian INOVA spectrometer (500 MHz for $^1$H) at 22° C. $^{25}$Mg {H} NMR spectra were recorded on a Varian-AGILENT spectrometer (900 MHz for $^1$H) at 22° C. The $^{27}$Al{$^1$H} NMR and $^{25}$Mg {$^1$H} NMR spectra were proton decoupled and are referenced to external AlCl$_3$/H$_2$O and MgCl$_2$/H$_2$O respectively.

All electrochemical experiments were carried out under an atmosphere of Argon. Cyclic voltammetry experiments were performed with a CH Instruments model 660C potentiostat. The working electrodes (1.0 mm PEEK-encased glassy carbon, Cypress Systems EE040; 2.0 mm Pt working electrode, CH Instruments, CHI102) were polished using Al$_2$O$_3$(BAS CF-1050, dried at 150° C. under vacuum) suspended in methanol, and then rinsed with neat tetrahydrofuran. A glassy carbon rod was used as the counter electrode. A piece of Mg strip was freshly polished and used as the reference electrode.

The electrolyte conductivity was measured using WP CP650 conductivity meter Oakton Instruments): MgCl$_2$—AlCl$_3$(0.04 M), 0.26 mS/cm; MgCl$_2$—AlPh$_3$(0.43 M), 2.96 mS/cm; MgCl$_2$—AlEtCl$_2$(0.7 M), 6.99 mS/cm.

Prototype rechargeable Mg batteries in coin type cells (standard 2030 parts from NRC Canada) were assembled from a fresh polished Mg disk anode, a Mo$_6$S$_8$-carbon composite cathode, and a separator (glass fiber B) soaked in the electrolyte solution. Cell tests were performed on an Arbin Battery Tester BT-2000 (Arbin Instruments, College Station, Tex.) at room temperature. A Mo$_6$S$_8$-carbon composite electrode slurry was prepared by mixing 80 wt % active material (Mo$_6$S$_8$), 10 wt % super-C carbon powder and 10 wt % poly(vinylidene fluoride) (PVDF) in N-methyl-2-pyrrolidinone. The slurry was coated onto carbon paper substrate to prepare the cathode disks.

The MgCl$_2$—AlCl$_3$ electrolyte was prepared by adding AlCl$_3$ (0.400 g, 3.0 mmol in 50 mL THF) dropwise to a suspension of MgCl$_2$ (0.570 g, 6.0 mmol in 50 mLTHF) in a 200 mL round-bottom flask under Ar. The mixture was stirred for 6 h at 22° C. Reaction completion was confirmed by $^{27}$Al{$^1$H} NMR spectroscopy. After filtration, THF was removed under vacuum to give a white powder. Yield was approximately quantitative. The white powder was used for spectroscopic analyses and electrochemical studies without further purification. Solubility of the electrolyte (0.04 M) was determined by slowly dissolving the electrolyte powder in 1.0 mL THF until a supersaturated solution was observed. Higher concentrations were not attainable, which is consistent with what is known in the art. Single crystals of [(μ-Cl)$_3$Mg$_2$(THF)$_6$]AlCl$_4$ for X-ray diffraction studies were grown by pentane vapor diffusion into a THF solution. $^1$H NMR (THF-d$_8$): 3.62 (m, 24H, THF), 1.78 (m, 24H, THF). $^{27}$Al{$^1$H} NMR (THF):102.4 ppm, assigned to AlCl$_4^-$.[21] $^{25}$Mg{$^1$H} NMR (THF): 6.4 ppm.

The MgCl$_2$—AlPh$_3$ electrolyte was prepared from AlPh$_3$ (0.258 g, 1.0 mmol in 1.0 mL dibutylether) and MgCl$_2$ (0.190 g, 2.0 mmol in 10 mL THF) similarly to the MgCl$_2$—AlCl$_3$ Electrolyte. Solubility of the electrolyte was determined to be 0.43 M, which is at least ten times greater than that when using AlCl$_3$ Single crystals of [(μ-Cl)$_3$Mg$_2$(THF)$_6$]AlPh$_3$Cl for X-ray diffraction studies were grown by pentane vapor diffusion into a THF solution. $^1$H NMR (THF-d$_8$): 7.70 (m, 6H, Ph), 7.09 (m, 9H, Ph), 3.62 (m, 24H, THF), 1.78 (m, 24H, THF). $^{27}$Al{$^1$H} NMR (THF): 136.0 ppm, assigned to AlPh$_3$Cl$^-$.[10] $^{25}$Mg {$^1$H} NMR (THF): 5.4 ppm.

The MgCl$_2$—AlEtCl$_2$ electrolyte was prepared from AlEtCl$_2$ (0.315 g, 5.0 mmol in 10 mL THF) and MgCl$_2$ (0.950 g, 10.0 mmol in 10 mL THF) using a procedure similar to that described for the MgCl$_2$—AlCl$_3$ electrolyte. Solubility of the electrolyte was determined to be 0.7 M. Single crystals of [(μ-Cl)$_3$Mg$_2$(THF)$_6$]AlEtCl$_3$ for X-ray diffraction studies were grown by pentane vapor diffusion into a THF solution. $^1$H NMR (THF-d$_8$): 3.62 (m, 24H, THF), 1.78 (m, 24H, THF), 0.96 (m, 3H, —CH$_3$), -0.10 (m, 2H, —CH$_2$—). $^{27}$Al{$^1$H} NMR (THF): 128.1 ppm, assigned to AlEtCl$_3^-$.[22] $^{25}$Mg{$^1$H} NMR (THF): 4.6 ppm.

One of the possible reaction mechanisms of MgCl$_2$ and the Al Lewis acids in THF is described to demonstrate the formation of the electrochemically active [(μ-Cl)$_3$Mg$_2$(THF)$_6$]$^+$ dimer monocation in these electrolytes and their improved performance compared to traditional electrolytes using nucleophilic Mg$^{2+}$ sources. This mechanism, which can be generalized for a magnesium dihalide and a Lewis acid according to embodiments of the present invention, has been tested according to DFT calculations. The anion possesses a low-lying HOMO frontier orbit and is more difficult to oxidize compared to other anions. Furthermore, the resulting dimer species is expected to have a high oxidation stability.

Figure 1:
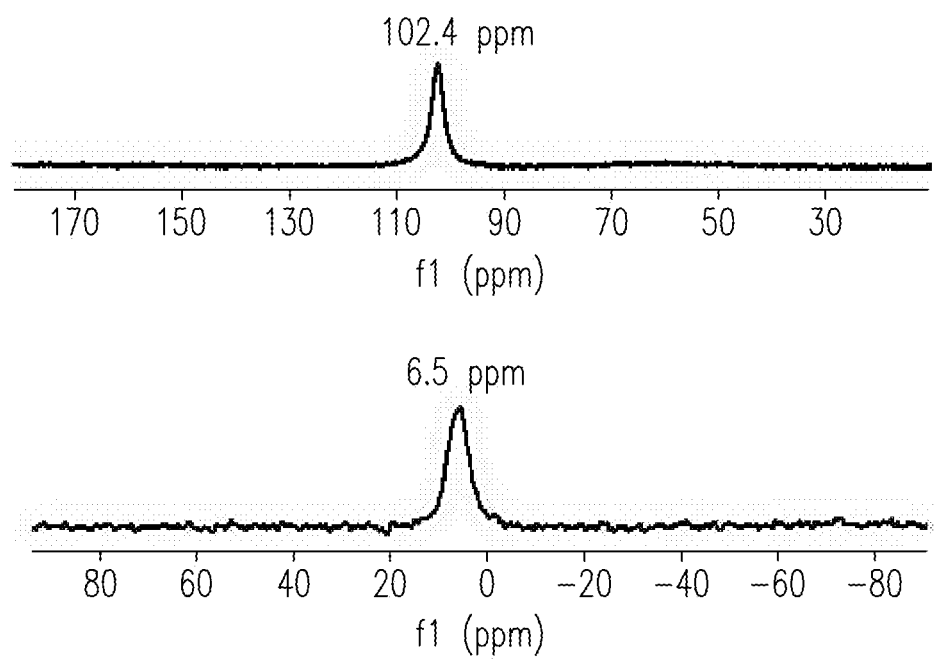
FIG. 1 contains nuclear magnetic resonance spectra obtained from a $MgCl_2$—$AlCl_3$ electrolyte.

A mixture of MgCl$_2$ and AlCl$_3$ in a ratio of 2:1 was combined in THF and stirred for 6 h at room temperature. The $^{27}$Al{$^1$H} NMR spectrum of the resulting solution shows one Al$^{3+}$ resonance at 102.4 ppm[21] (see FIG. 1), confirming the formation of the AlCl$_4^-$ anion. The $^{25}$Mg {$^1$H} NMR spectrum displays a singlet at 6.5 ppm, consistent with the formation of a new Mg$^{2+}$ species (see FIG. 1) compared to MgCl$_2$ in THF (7.9 ppm).[22] A single crystal X-ray diffraction analysis of the recrystallized product further confirmed the chemical nature of the reaction product.

Figure 2A:
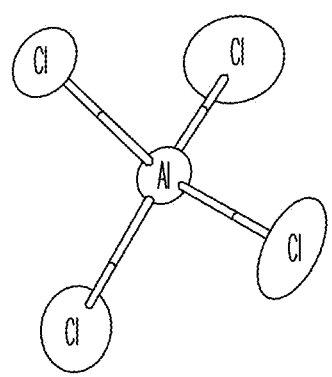
Figure 2B:
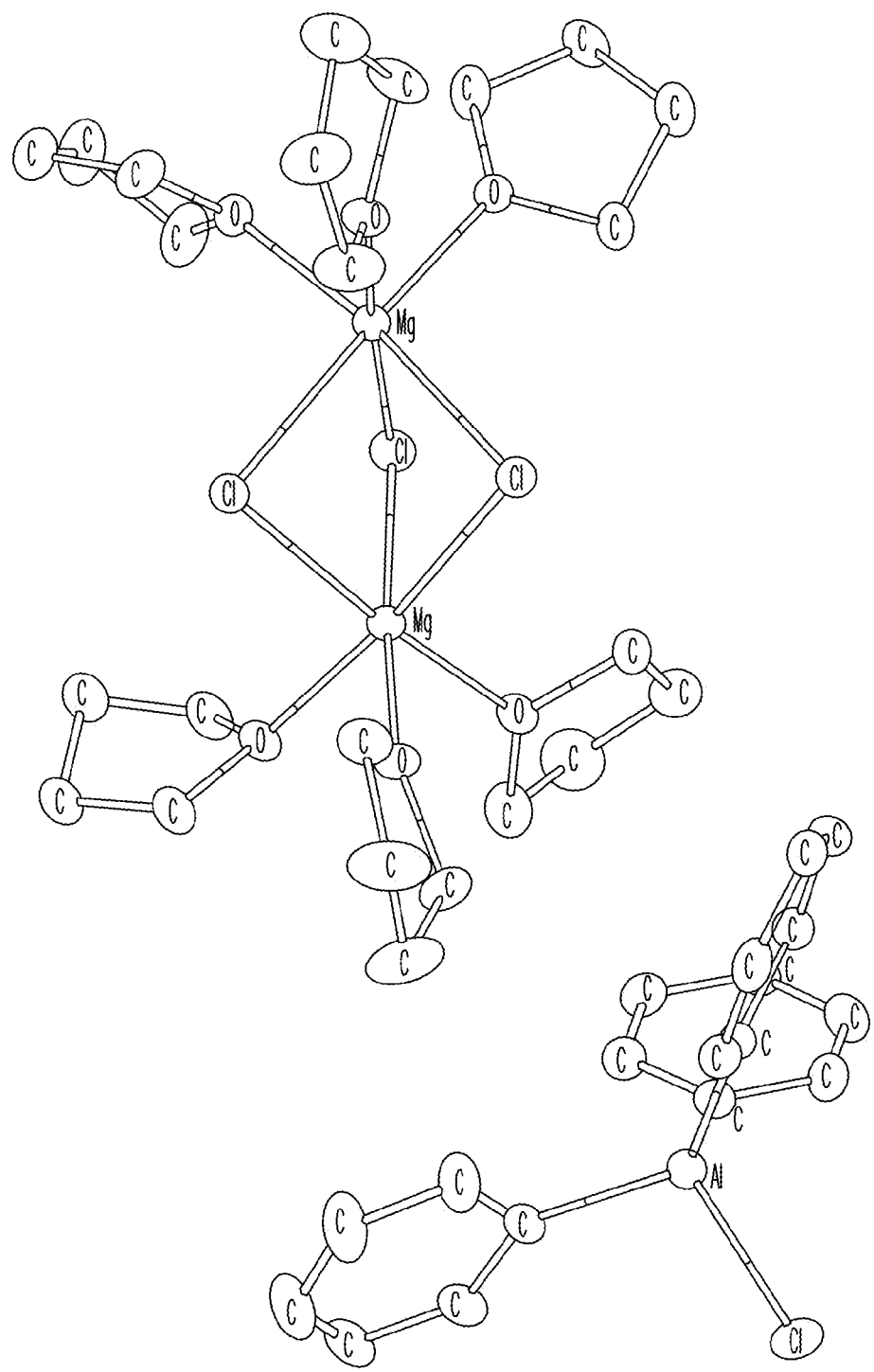

As shown in FIG. 2, the molecular structure of the electrolyte consists of a Mg-dimer monocation, [(μ-Cl)$_3$Mg$_2$(THF)$_6$]$^+$ and an AlCl$_4^-$ anion, according to equation 2. The cation adopts a pseudo-D3h symmetry with three bridging Cl$^-$ ligands between two Mg$^{2+}$ and three terminal THF ligands on each Mg$^{2+}$; each Mg has an octahedral geometry. Selected bonding distances (Å) and angles (°) for [(μ-Cl)$_3$Mg$_2$(THF)$_6$]AlEtCl$_3$: averaged Mg—O, 2.08; averaged Mg—Cl, 2.504; averaged Al—Cl, 2.101; averaged Mg1-Cl—Mg2, 77.81. Selected bonding distances and angles for [(μ-Cl)$_3$Mg$_2$(THF)$_6$]AlPh$_3$: averaged Mg—O, 2.084; averaged Mg—Cl, 2.523; Al—Cl, 2.2160 (9); averaged Al—C(Ph), 2.014; averaged Mg1-Cl—Mg2, 78.12. Similar structures are relevant for different halide species (e.g., F, Br, I, etc.), metal centers (e.g., B, Ga, In, Fe, etc.), and solvents (e.g., DME, diglyme, THF, etc.), though bonding distances and angles would vary.

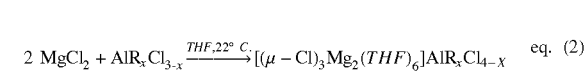

$$2\ MgCl_2 + AlR_xCl_{3-x} \xrightarrow{THF, 22°\ C.} [(\mu - Cl)_3Mg_2(THF)_6]AlR_xCl_{4-x} \quad \text{eq. (2)}$$

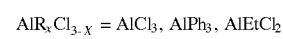

$AlR_xCl_{3-X} = AlCl_3, AlPh_3, AlEtCl_2$

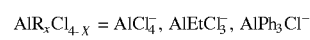

$AlR_xCl_{4-X} = AlCl_4^-, AlEtCl_3^-, AlPh_3Cl^-$

Figure 3:
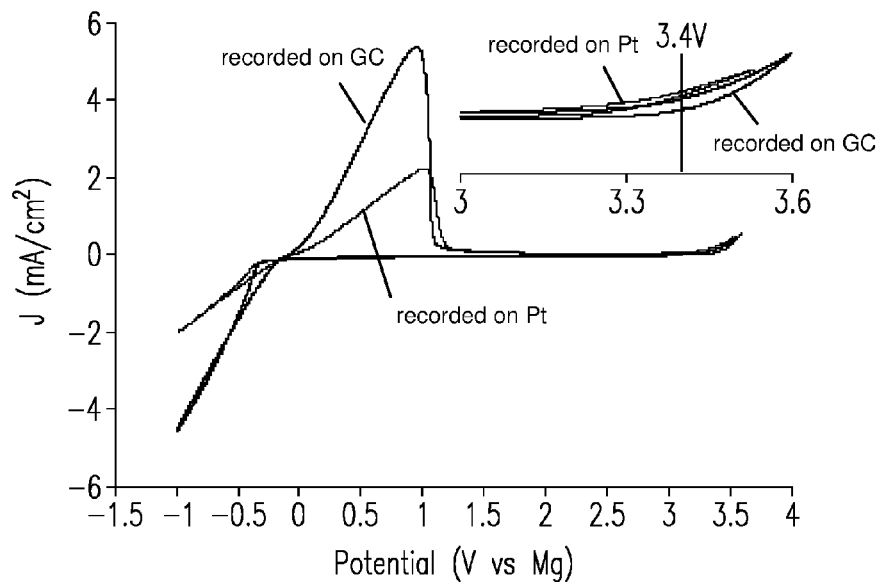
FIG. 3 is a cyclic voltammogram of a cell having an $MgCl_2$—$AlCl_3$ electrolyte.

The reaction product without further purification was examined for its activity as an electrolyte for $Mg^{2+}$ plating and stripping. As shown in FIG. 3 (red trace), a cyclic voltammogram of a $MgCl_2$—$AlCl_3$ electrolyte (0.04 M based on $[(\mu\text{-}Cl)_3Mg_2(THF)_6]AlCl_4$ in THF) recorded at 50 mV/s on a glassy carbon (GC) electrode displays the redox process for the $Mg^{2+}$ plating and stripping with an onset potential at −0.29 V vs Mg. A cyclic voltammogram recorded on a Pt electrode shows almost identical electrochemical observations except decreased current density for $Mg^{2+}$ cycling (FIG. 3, blue trace). The coulombic efficiencies on GC and Pt are calculated to be approximately 90% by comparing the amount of charges passed for the plating and stripping processes. The irreversible oxidation wave of the electrolyte, at which the oxidation current is <20 $\mu A/cm^2$, was observed at approximately 3.4 V vs Mg (see inset in FIG. 3). Compared to $MgBu_2$—$AlCl_3$ (oxidized at ca. 2.3 V vs Mg) electrolytes using the same Lewis acid ($AlCl_3$) but a nucleophilic $Mg^{2+}$ source, the oxidation stability of the $MgCl_2$—$AlCl_3$ electrolyte is improved by 1.1 V. The difference is attributed to the absence of nucleophilic species in the $MgCl_2$—$AlCl_3$ electrolyte described herein and the oxidation stability of $AlCl_4^-$. Identical CV results were observed for an electrolyte solution prepared from the crystallized product, indicating that the same electrochemically active species of the electrolyte solution exists whether obtained from the magnesium dihalide and Lewis acid constituents or the crystallized product. Changing the ratio of $MgCl_2$ and $AlCl_3$ (1:1 and 1:2) resulted in decreasing current density and increasing overpotential (>0.58 V) for $Mg^{2+}$ cycling. The control studies suggest that changing the ratio of the Lewis base and Lewis acid might lead to formation of different electrochemically active species, which can result in different reaction mechanisms than that described above. Such mechanisms are encompassed by embodiments of the present invention.

A $MgCl_2$—$AlPh_3$ electrolyte solution and a $MgCl_2$—$AlEtCl_2$ electrolyte solution were prepared in a similar fashion as used for the $MgCl_2$—$AlCl_3$ electrolyte solution (equation 2). Both electrolyte solutions were characterized by $^1H$, $^{27}Al\{^1H\}$ and $^{25}Mg\{^1H\}$ NMR spectroscopies. Single crystal X-ray diffraction study of the $MgCl_2$—$AlPh_3Cl$ electrolyte confirmed its molecular identity comprising of the same $Mg^{2+}$-dimer cation with $AlPh_3Cl^-$ (see FIG. 2, right). Preliminary single crystal X-ray diffraction data of the $MgCl_2$—$AlEtCl_2$ electrolyte also confirmed the core structural connectivity ($Mg_2Cl_3O_6$) of the $Mg^{2+}$-dimer cation. Together with its NMR data, the molecular structure of the $MgCl_2$—$AlEtCl_2$ electrolyte is assigned as $[(\mu\text{-}Cl)_3Mg_2(THF)_6]AlEtCl_3$.

Figure 4A:
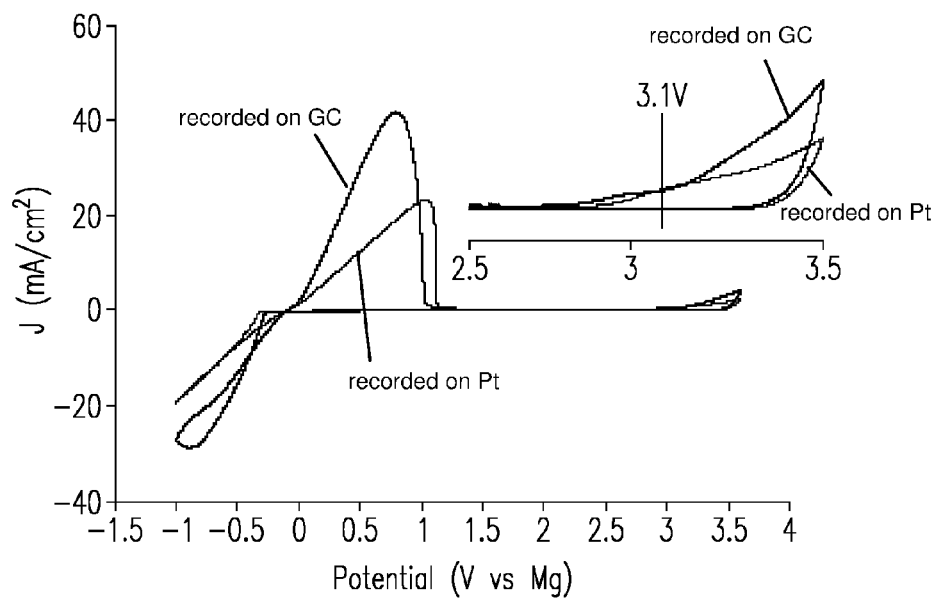
FIGS. 4A and 4B are cyclic voltammograms of cells having an $MgCl_2$—$AlPh_3Cl$ electrolyte and an $MgCl_2$—$AlEtCl_2$ electrolyte, respectively, according to embodiments of the present invention.
Figure 4B:
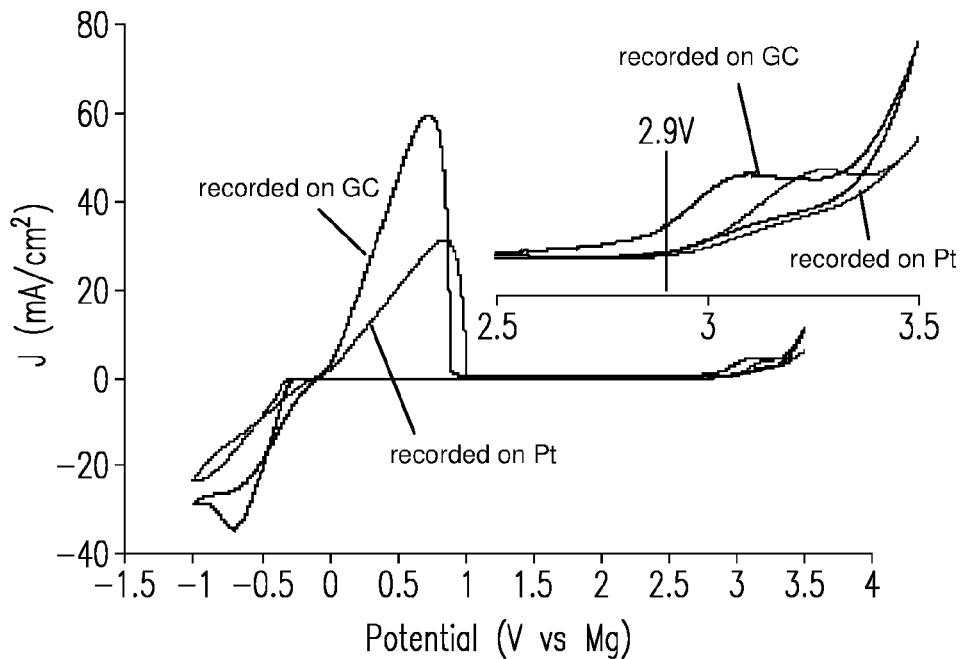

The electrochemical activities of the $MgCl_2$—$AlPh_3$ and $MgCl_2$—$AlEtCl_2$ electrolytes for $Mg^{2+}$ cycling were confirmed by cyclic voltammetry recorded on a GC (glassy carbon) electrode and a Pt electrode (see FIG. 4). Both electrolytes demonstrated approximately 100% coulombic efficiency for $Mg^{2+}$ plating and striping. The onset potentials of both electrolytes occur at −0.29 V vs Mg, suggesting that the three electrolytes share the same active $Mg^{2+}$ species, $[(\mu\text{-}Cl)_3Mg_2(THF)_6]^+$, for the $Mg^{2+}$ cycling. The $MgCl_2$—$AlPh_3$ electrolyte and the $MgCl_2$—$AlEtCl_2$ electrolyte possess the irreversible oxidation at 3.1 and 2.9 V vs Mg respectively (see FIGS. 4A and 4B, inset). Compared to the $MgCl_2$—$AlCl_3$ electrolyte, the reduced anodic stability of both electrolytes is believed to be associated with their less oxidatively stable anions. It is noteworthy that the electrochemical oxidation stability of the $MgCl_2$—$AlEtCl_2$ electrolyte can be enhanced by 0.8 V and 0.4 V compared to the in situ $MgBu_2$—$AlEtCl_2$ electrolyte and the recrystallized $MgBu_2$—$AlEtCl_2$ electrolyte, which appear to contain the same active species, $[(\mu\text{-}Cl)_3Mg_2(THF)_6]AlEtCl_3$. The poor oxidation stability of the $MgBu_2$—$AlEtCl_2$ electrolyte is ascribed to the presence of nucleophilic $MgBu_2$ even after recrystallization. In addition, the change of the anion also dramatically affects the solubility of both electrolytes in THF; almost 0.43 M for the $MgCl_2$—$AlPh_3$ electrolyte and approximately 0.7 M for the $MgCl_2$—$AlEtCl_2$ electrolyte, which is significantly higher than that of the $MgCl_2$—$AlCl_3$ electrolyte (0.04 M). Correspondingly, the current densities of both electrolytes at their saturated concentrations are much higher than that of the $MgCl_2$—$AlCl_3$ electrolyte: 28.2 $mA/cm^2$ for the $MgCl_2$—$AlPh_3$ electrolyte and 32.7 $mA/cm^2$ for the $MgCl_2$—$AlEtCl_2$ electrolyte. Consistently, the $MgCl_2$—$AlPh_3$ and $MgCl_2$—$AlEtCl_2$ electrolytes exhibit much higher conductivity than the $MgCl_2$—$AlCl_3$ electrolyte, 6.99 mS/cm at 0.7 M and 2.96 mS/cm at 0.43 M respectively, which are comparable to the electrolytes used in Li batteries.

In some embodiments, the Mg-based energy storage device is a high energy density Mg—S battery. Such embodiments are feasible because of the substantial absence of reactive W nucleophiles. The compatibility of magnesium dihalide and Lewis acid reactants with excess sulfur powder (5 times) was observed by $^1H$ and $^{27}Al\{^1H\}$ NMR spectroscopies over a course of 20 days. The electrolyte solution (0.015 g, 20 mM in 1.0 mL THF) was loaded into two J-Young NMR tubes under Ar. For $^{27}Al\{^1H\}$ NMR, the NMR tube was preloaded with a sealed capillary containing 40 mM $Al(H_2O)_6Cl_3$ as the internal reference of chemical shift and concentration. The first $^1H$ NMR and $^{27}Al\{^1H\}$ NMR spectra were recorded and then excess sulfur powder (0.026 g, 0.1 mmol, 5.0 equivalents) was added into the NMR tubes. The two NMR tubes containing the resulting mixture were followed by $^1H$ NMR and $^{27}Al\{^1H\}$ NMR spectroscopies respectively up to 20 days. According to $^1H$ NMR and $^{27}Al\{^1H\}$ NMR data, there was no degradation observed for the $MgCl_2$—$AlCl_3$ and $MgCl_2$—$AlEtCl_2$ electrolytes. $^1H$ NMR indicates slow degradation of the $MgCl_2$—$AlPh_3$ electrolyte, accompanied with a color change of colorlessness to yellow.

For $MgCl_2$—$AlCl_3$ and $MgCl_2$—$AlEtCl_2$ electrolytes, $^1H$ and $^{27}Al\{^1H\}$ NMR studies no degradation was detected. The sulfur inertness confirms the non-nucleophilic nature of these electrolytes, which is attributed to their non-nucleophilic anions and the absence of reactive $R^-$ nucleophiles. For the $MgCl_2$—$AlPh_3$ electrolyte, slow degradation was indicated by the appearance of new proton resonances of phenyl groups from 7.2 to 7.65 ppm, accompanied with a color change from colorless to yellow. Although there are no $R^-$ nucleophiles present in the $MgCl_2$—$AlPh_3$ electrolyte, the anion, $AlPh_3Cl$, still possesses a slight character of nucleophilicity. These results indicate the sulfur compatibility of the electrolytes is also dependent on the chemical nature of the anions.

Figure 5A:
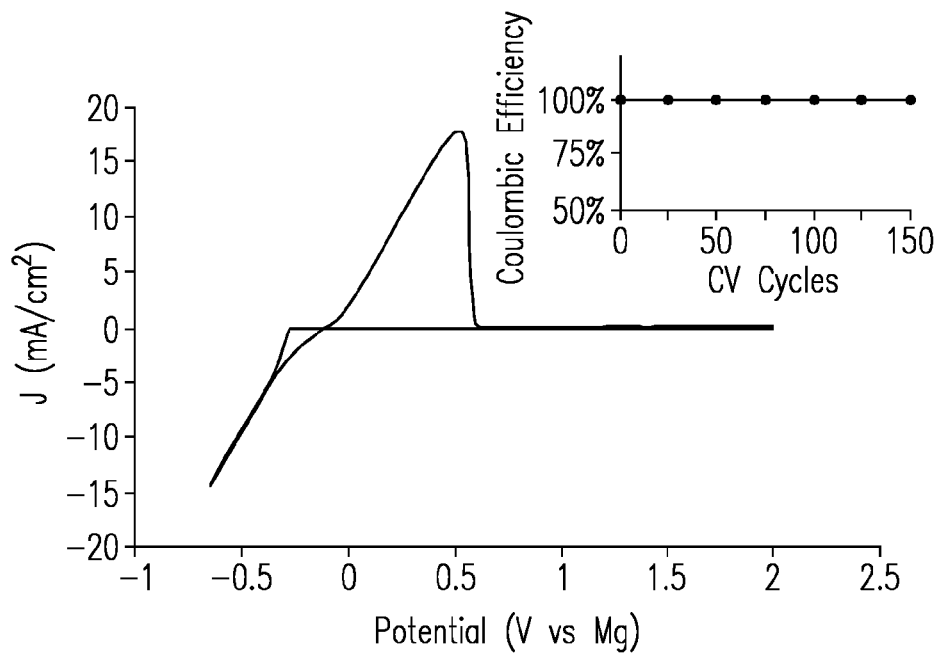
FIG. 5A-5D includes, according to embodiments of the present invention, (A) Overlap of continuously repeated 250 cycles of CV of the $MgCl_2$—$AlEtCl_3$ electrolyte (0.7 M based on $[(\mu\text{-Cl})_3Mg_2(THF)_6]AlEtCl_3$ in THF) recorded on Pt electrode. Inset shows coulombic efficiency vs. CV cycles; (B) Plots of charge over time of the representative $Mg^{2+}$ plating and stripping cycles; (C) an energy dispersive X-ray spectrum recorded for a Pt plate electrode after electrochemical $Mg^{2+}$ deposition using the $MgCl_2$—$AlEtCl_3$ electrolyte; and (D) scanning electron microscope micrographs of the deposited Mg on a Pt plate at 100 μm and 10 μm (inset) resolutions.
Figure 5B:
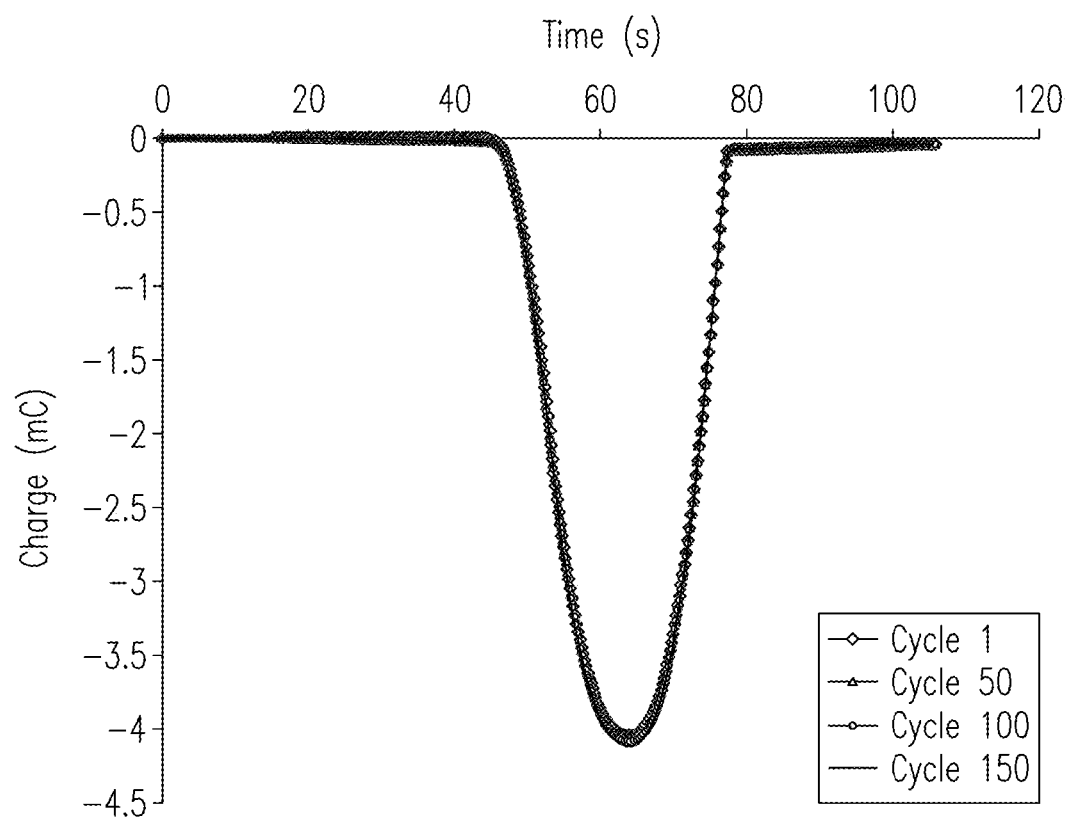

The electrochemical stability of an $MgCl_2$—$AlEtCl_2$ electrolyte (0.7 M based on $[(\mu\text{-}Cl)_3Mg2(THF)_6]AlEtCl_3$ in THF) was examined by continuous cyclic voltammetry. 150 cycles of continuously repeated CVs (scan rate, 50 mV/s; reference electrode, a Mg strip; counter electrode, glassy carbon; 22° C.; under 1.0 atm Ar) of the electrolyte recorded on a Pt electrode in 5 hr was completely overlapped (see FIG. 5A). In FIG. 5B, the plots of the charge (including both plating and stripping) over time were shown for cycles 1, 50, 100 and 150. The overlapped plots and equivalent charges of plating and stripping processes indicate the coulombic efficiency of $Mg^{2+}$ cycling was approximately 100% from the first cycle to the 150th cycle (FIG. 5A, inset). The electrochemical observation confirms a reversible and clean electrochemical reaction of the electrolyte for $Mg^{2+}$ cycling, a highly desired electrolyte property for assembling rechargeable Mg batteries.

Figure 5C:
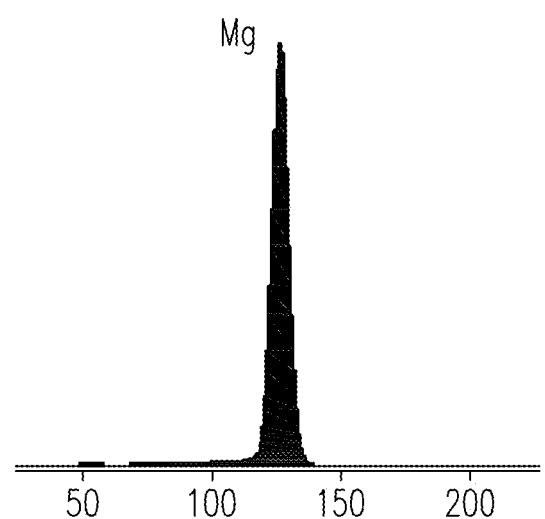
Figure 5D:
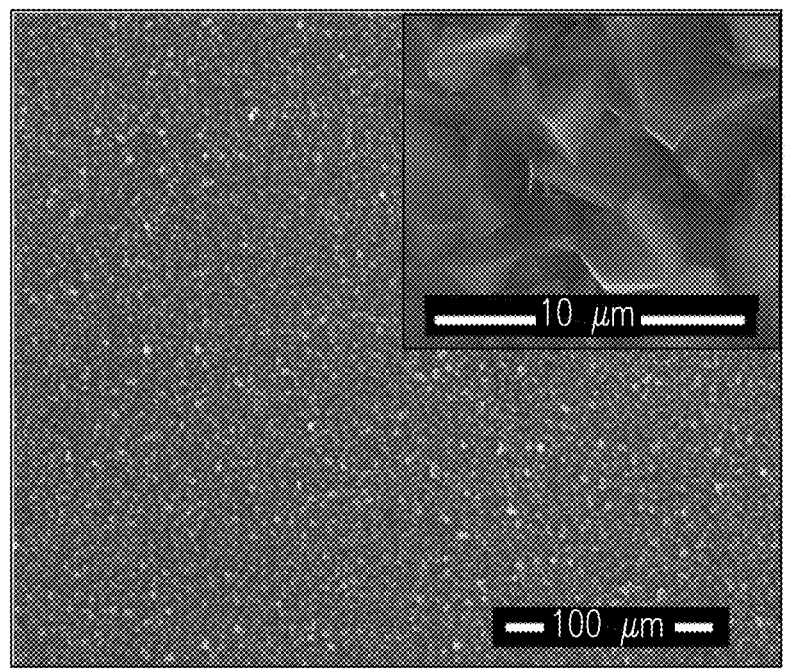

Clean plating of $Mg^{2+}$ on a Pt plate was confirmed by EDX (see FIG. 5C) after deposition using a $MgCl_2$—$AlCl_3$ electrolyte (0.15 M based on $[(\mu\text{-}Cl)_3Mg_2(THF)_6]AlEtCl_3$ in THF). The morphology of the deposited Mg using the $MgCl_2$—$AlEtCl_3$ electrolyte was investigated by high resolution SEM. The SEM images exhibit dendrite free, smooth and uniform Mg deposition on the Pt plate (FIG. 5D). The size of the deposited Mg grains in rock shape ranges from ca. 2 to 5 μM (see inset in FIG. 5D).

Figure 6:
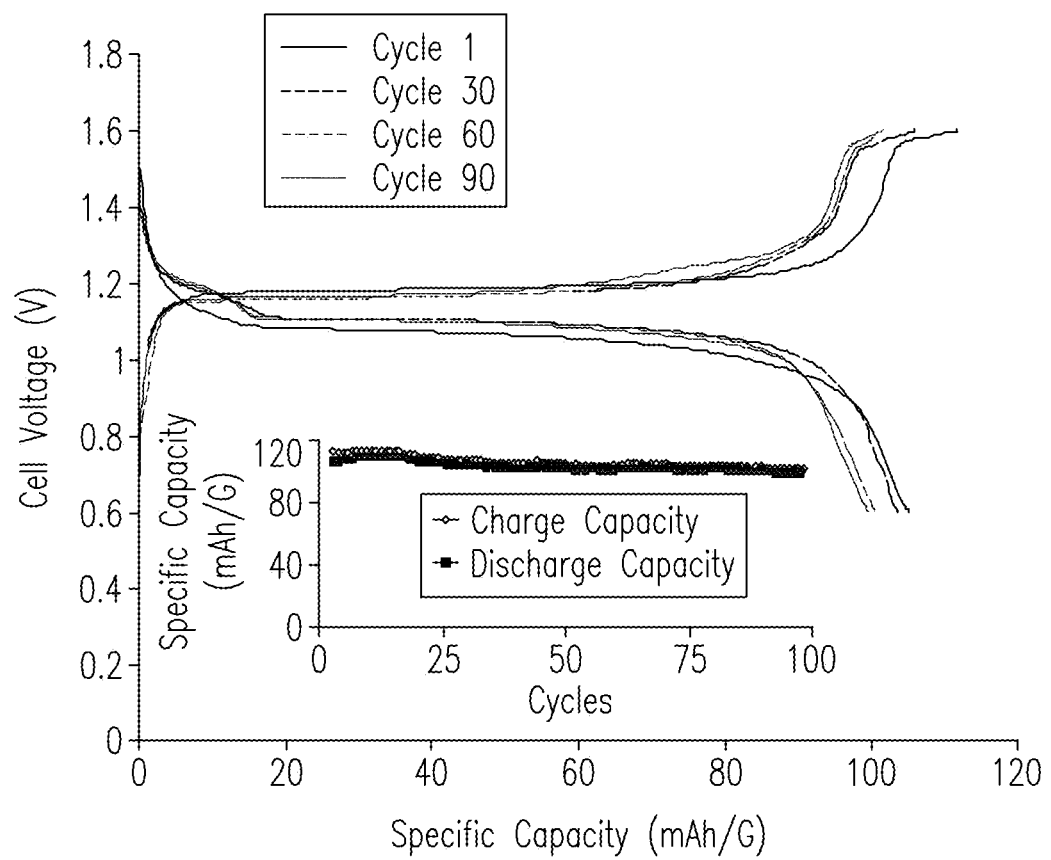
FIG. 6 Galvanostatic charging and discharging profiles (cell voltage-capacity plots) after 1, 30, 60, and 90 cycles of a coin-cell prototype of a Mg rechargeable battery comprising an $MgCl_2$—$AlEtCl_2$ electrolyte, Mg anode, and $Mo_6S_8$ cathode, according to embodiments of the present invention. The inset shows the charging and discharging capacities over 100 cycles.

A coin-cell prototype of rechargeable Mg batteries was fabricated from a Mg disk anode, a cathode disk consisting of the intercalating $Mo_6S_8$ (1.05 V vs Mg) cluster and carbon powder, and 0.3 M $MgCl_2$—$AlEtCl_2$ electrolyte. Chevrel phase $Mo_6S_8$ was synthesized using the molten salt synthesis method described by Aurbach et al (see E. Lancry, E. Levi, A. Mitelman, S. Malovany and D. Aurbach, *J. Solid State Chem.*, 2006, 179, 1879-1882.). The cell test was performed at a rate of 0.1 C with the charging and discharging limits at 1.6 V and 0.6 V for 100 cycles. FIG. 6 displays the representative charging and discharging profiles in steady plateau shapes for the $1^{st}$ (blue trace), $30^{th}$ (green trace), $60^{th}$ (red trace) and $90^{th}$ (pink trace) cycles. The cell capacity was initially recorded at 104 mAh/g and retained at 95.1% (99 mAh/g) at the $100^{th}$ cycle (see FIG. 5, inset). The results indicate stable cell performance of the electrolyte.

Figure 7:
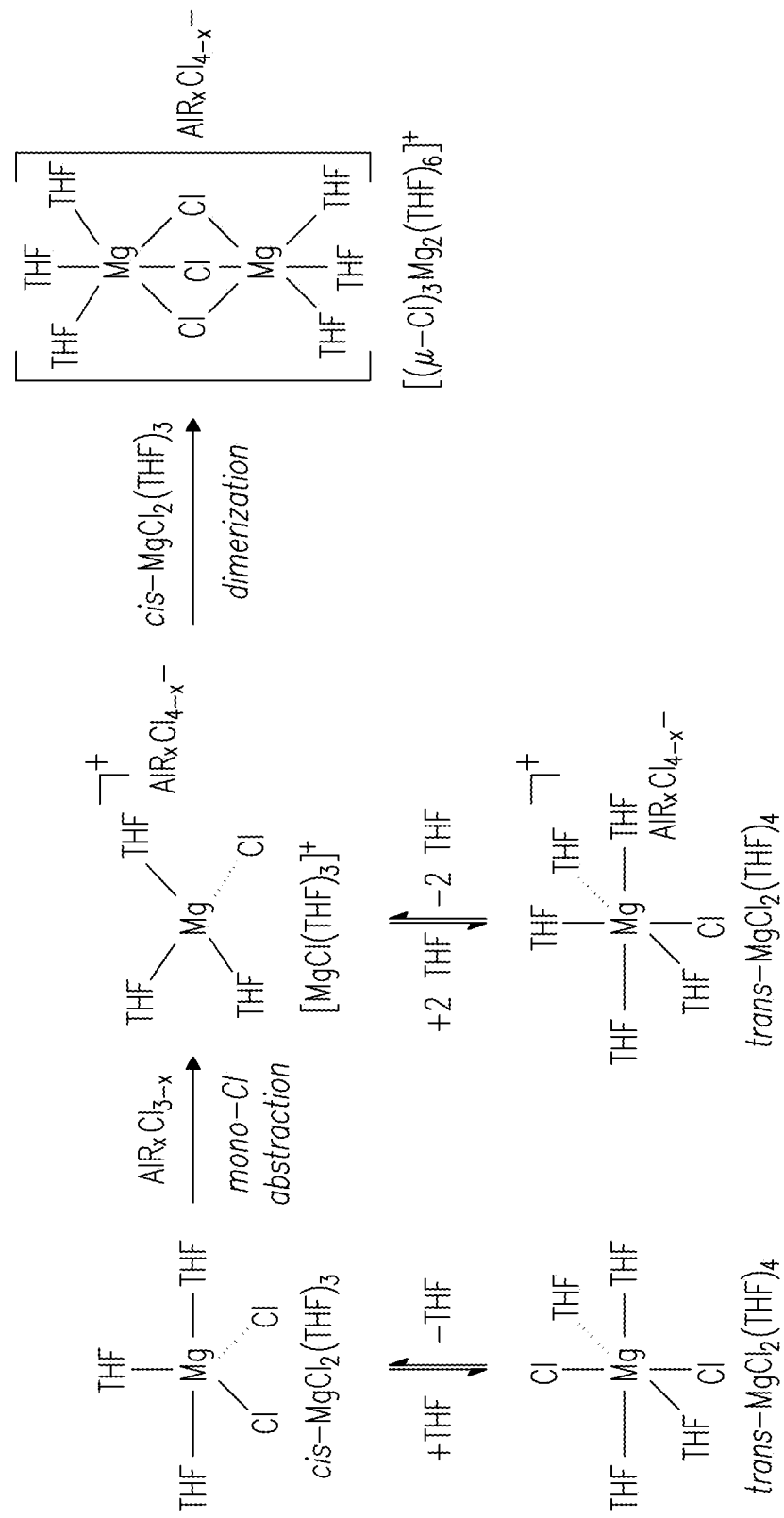
FIG. 7 depicts a possible reaction sequence to form $[(\mu\text{-}Cl)_3Mg_2(THF)_6]^+$ according to embodiments of the present invention.

Referring to FIG. 7, illustrations depict potential reaction sequences between $MgCl_2$ and an Al Lewis acid, according to one embodiment. THF-solvated $MgCl_2$ in solid state was determined as octahedral trans-$MgCl_2(THF)_4$ while DFT calculations suggests several possible THF solvated $MgCl_2$ species in THF including trigonal planar $MgCl_2(THF)$, tetrahedral $MgCl_2(THF)_2$, trigonal bipyramidal cis-$MgCl_2(THF)_3$, trans-$MgCl_2(THF)_4$ and cis-$MgCl_2(THF)_4$. As discussed below, cis-$MgCl_2(THF)_3$ would be mostly feasible to form the $[(\mu\text{-}Cl)_3Mg_2(THF)_6]^+$ dimer without involving THF dissociation or association. One equivalent of cis-$MgCl_2(THF)_3$ transfers one $Cl^-$ to the Lewis acid, $AlR_xCl_{3-x}$ (X=1-3), i.e. mono-$Cl^-$ abstraction, to generate a tetra-coordinated cation, $[MgCl(THF)_3]^+$. The resulting $[MgCl(THF)_3]^+$ cation undergoes a dimerization reaction with the second equivalent of cis-$MgCl_2(THF)_3$ to form the dimer cation. It is possible that there are equilibriums between $[(\mu\text{-}Cl)_3Mg_2(THF)_6]^+$, trans-$MgCl_2(THF)_4$, $[MgCl(THF)_5]^+$ and cis-$MgCl_2(THF)_3$. The different Mg resonances observed for three electrolytes could be ascribed to the different equilibrium distributions of these THF solvated $Mg^{2+}$ species which can lead to different averaged chemical shifts through fast exchange.

RMgCl and $MgR_2$ involve both alkyl (or aryl) and $Cl^-$ transmetalation reactions with Lewis acid to form a more complicated equilibrium mixture of different $Mg^{2+}$ species and anion species. In the case of RMgCl, the optimal reaction stoichiometry to form the $Mg^{2+}$ dimer is three equivalent of RMgCl and 1 equivalent of Lewis acid. For example, a proposed reaction between RMgCl and $AlCl_3$ is exhibited in FIG. 8B. The formation of the $Mg^{2+}$ dimer is accompanied with the formation of one equivalent of $MgR_2$. $MgR_2$ is an undesired nucleophilic species. Also $MgR_2$ could further undergo further exchange reactions with the anion, $AlRCl_3^-$, to form multiple R substituted anions. Similarly, $MgR_2$ can react with $AlCl_3$ in a complicating fashion (see FIG. 8C).

Figure 8A:
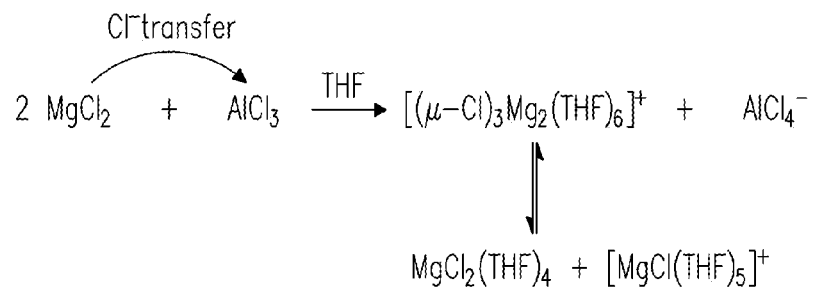
FIG. 8A-8C depicts metathiesis reactions of (A) $MgCl_2$ according to embodiments of the present invention compared to those of (B) RMgCl and (C) $MgR_2$ with $AlCl_3$.
Figure 8B:
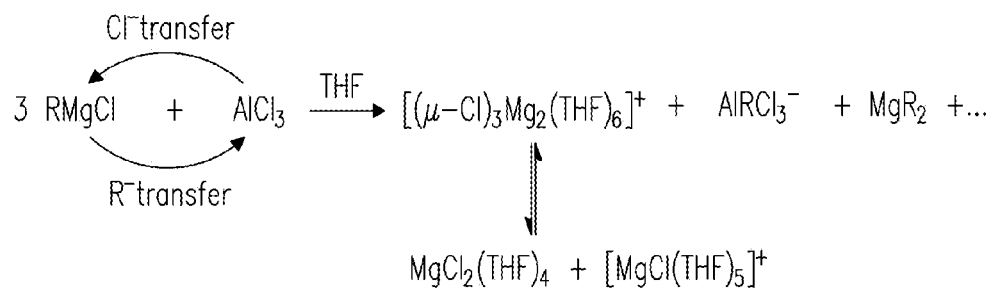
Figure 8C:
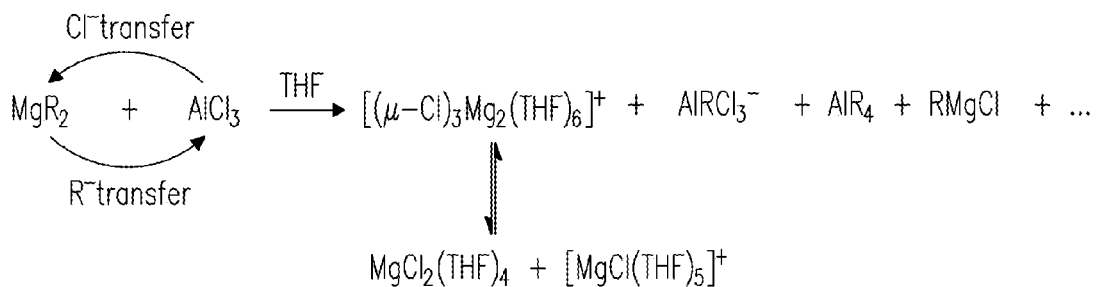

Embodiments of the present invention do not yield the many species characteristic of traditional electrolytes (see FIG. 8A). Furthermore, embodiments of the present invention have several synthetic advantages over the previous traditional methods using nucleophilic $Mg^{2+}$ sources. Magnesium dihalides, like $MgCl_2$, as a $Mg^{2+}$ source are much cheaper compared to RMgCl or $MgR_2$ and are non-nucleophilic. Handling magnesium dihalides is much easier than the reactive $Mg^{2+}$ chemicals such as RMgCl or $MgR_2$. Because of the clean reaction nature, there is no need for recrystallization or other purification steps after reaction. Consequently, yields of the electrolytes are almost quantitative, representing an atom-economical synthesis. However, for electrolytes prepared from the nucleophilic $Mg^{2+}$ sources or Grignard reagents, recrystallization must commonly be done to remove any nucleophilic $Mg^{2+}$ species along with sacrificing product yield. However purification is not guaranteed to effectively remove all nucleophilic $Mg^{2+}$ byproducts.

The electrolytes comprising magnesium dihalides and Lewis acids according to embodiments described herein, exhibit overall performance (synthetic feasibility, oxidation stability and nulceophilic susceptibility) superiority compared to traditional electrolytes. According to some embodiments, the characteristics and performance of the resulting electrolytes including oxidation stability, electrophilic susceptibility and conductivity can be modulated by the Lewis acid component (or the corresponding metal center anion). It can be expected, by selecting the Lewis acid component, which is widely commercially available or synthetically accessible, the oxidation stability, non-nucleophilicity and conductivity (i.e. electrolyte solubility) of the $MgX_2$-Lewis acid electrolytes can be further enhanced.

The electrochemical oxidation stability of $X^-$ containing electrolytes can be strongly dependent on the current collector. For example, $Cl^-$ containing electrolytes are typically not highly compatible with traditional current collectors (e.g., stainless steel and aluminum). In such instances, the current collector should be chosen to maximize compatibility with the electrolyte composition. Control experiments using stainless steel showed the oxidation of the $MgCl_2$—$AlEtCl_2$ electrolyte occurred at approximately 1.8 V, similar to the values of other $Cl^-$ containing electrolytes reported by others.

Magnesium dihalide ($MgX_2$) can be used as a non-nucleophilic and inexpensive $Mg^{2+}$ source in combining with the Lewis acids to yield high performance $Mg^{2+}$ electrolytes with oxidation stability up to 2.8V or even 3.4 V, coulombic efficiency up to 100% and improved electrophilic stability. The electrolytes according to embodiments described herein are sulfur compatible and can be applied for assembling high energy density Mg—S batteries. The reaction between $MgX_2$ and the Lewis acid can form the electrochemically active $[(\mu\text{-}Cl)_3Mg_2(THF)_6]^+$ mono-cations in a manner that is more atomically efficient (free of undesired byproducts), more cost effective and operationally easier (cheap $Mg^{2+}$ source, no precursor synthesis and no purification) in comparison to previously reported methods using nucleophilic RMgCl or $MgR_2$.

In some embodiments, one or more additional halide salts are added to the electrolyte. The additional halide salts can comprise a free-halide-anion donor comprising $X^-$, but not Mg. The free-halide-anion donor can increase the coulombic efficiency while retaining value over continuous runs. Furthermore, the free-halide-anion donor can significantly increase current density and charges passed for $Mg^{2+}$ cycling by enhancing ionic conductivity of electrolytes, even those containing nucleophilic $Mg^{2+}$ sources or Grignard reagents.

The practical use of Mg-electrolytes in energy storage devices can be evaluated initially according one electrochemical parameter, coulombic efficiency for $Mg^{2+}$ deposition and stripping. Coulombic efficiency as used herein, can refer to the ratio of the charge passed for $Mg^{2+}$ deposition and reverse stripping of $Mg^0$. The coulombic efficiency should be as close to 100% as possible for reliable battery performance in a practical device, meaning fully reversible for $Mg^{2+}$ deposition and stripping. Otherwise, Mg-batteries will rapidly lose the cycling capability of charging and discharging. Very few reported $Mg^{2+}$ electrolytes can meet this criterion. Many are subject to stripping fading during continuous $Mg^{2+}$ cycling (gradually decreasing coulombic efficiency from approximately 90% to even lower values) because of kinetically slow or unclean electrochemical reactions on electrode surface. The lack of a sufficient halide concentration is believed to be one reason for low coulombic efficiency because the absence of halide ions can hamper formation of $Mg^+$ intermediates during the $Mg^0$ stripping. Accordingly, embodiments of the present invention encompass the addition of a free-halide-anion donor. The free-halide-anion donor can be added to electrolytes resulting from the reaction of a Mg compound and a Lewis acid. The Mg compound has Mg and a halogen element (X). The Lewis acid has a metal center (M) and a supporting ligand comprising a halide (X). Examples of such Mg electrolytes include those resulting from the magnesium dihalide and Lewis acid compositions described herein as well as those resulting from traditional Mg sources (e.g., nucleophilic sources and/or Grignard reagents).

In the stripping process for $Mg^{2+}$ electrolytes, the free-halide-anion donor is believed to increase the free halide anion concentration, which can stabilize the $Mg^+$ oxidation state by forming the halide-ligated intermediate to facilitate the $Mg^+$ species undergoing complete oxidation to the $Mg^{2+}$ oxidation state. The free-halide-anion donor comprises a halide (X), but not Mg. The halide in the free-halide-anion donor should correspond to the halide in the magnesium compound and the Lewis acid, as described elsewhere herein.

Figure 9:
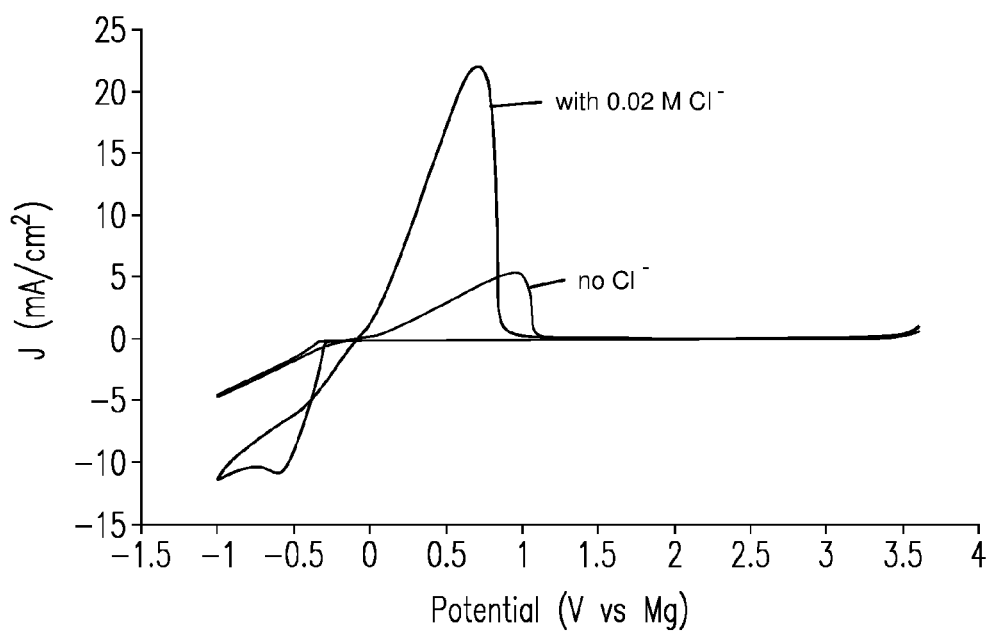
FIG. 9 includes cyclic voltammograms comparing the presence and absence of a free-halide-anion donor ($Bu_4NCl$) in a $MgCl_2$—$AlCl_3$ electrolyte according to embodiments of the present invention. Conditions: scan rate, 50 mV/s; working electrode, Pt; reference electrode, a Mg strip; counter electrode, glassy carbon; 22° C.; under 1.0 atm Ar.
Figure 10A:
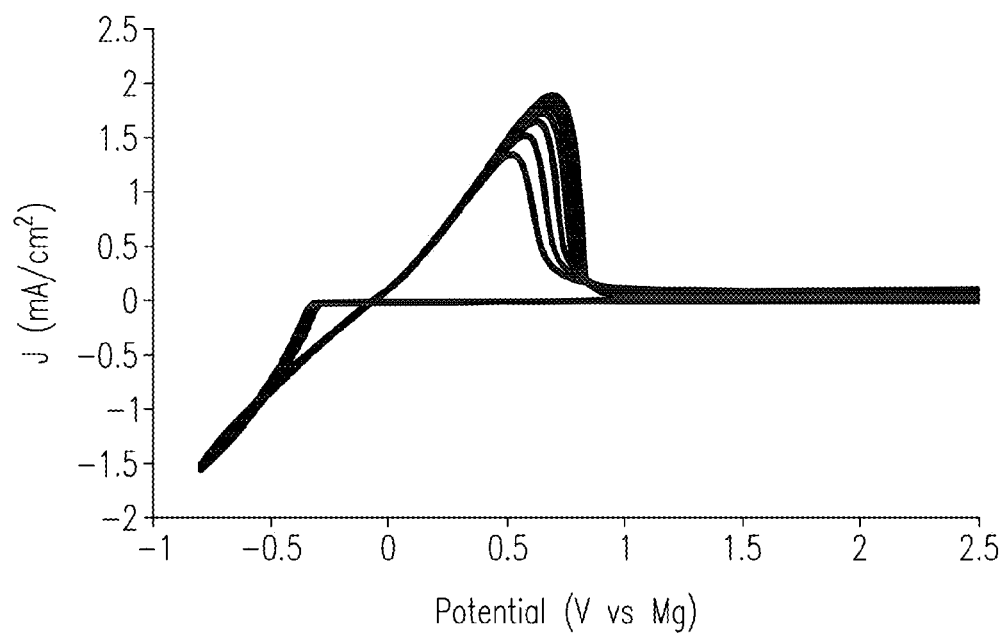
FIGS. 10A and 10B are continuous cyclic voltammograms from a cell having a $MgCl_2$—$AlCl_3$ electrolyte comparing the (A) absence of a free-halide-anion donor ($Bu_4NCl$) over 10 cycles and the (B) presence of ($Bu_4NCl$) over 400 cycles according to embodiments of the present invention. Same conditions as data shown in FIG. 9.d
Figure 10B:
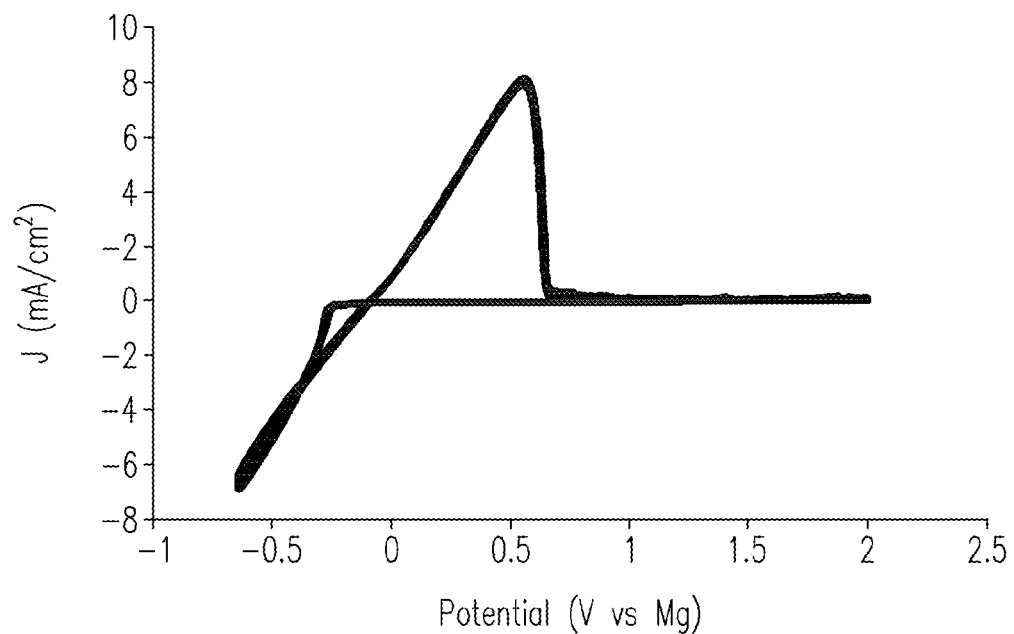

In one embodiment, the halide is chloride. A number of Cl salts (including tetraalkylammonium chloride, $Bu_4NCl$ (TBACl), bis(triphenylphosphine)iminium chloride, PPNCl, and LiCl) have been tested as an additive component for electrolytes lacking 100% coulombic efficiency. For example, one $MgCl_2$—$AlCl_3$ electrolyte exhibited a 90% CE prior to addition of the free-halide-anion donor. Referring to FIG. 9, the addition of free $Cl^-$ anions (0.02 M) can effectively increase the coulombic efficiency of the tested $Mg^{2+}$ electrolytes to 100%. Furthermore, comparing to FIGS. 10A (no free $Cl^-$ anion donor) and 10B (0.02 M free $Cl^-$ anion donor) the performance is stable with the free $Cl^-$ anion donor and can retain the full reversibility of $Mg^{2+}$ cycling for many cycles (up to 400 cycles tested over 10 h).

Besides improving the coulombic efficiency, the free-halide-anion donor can significantly increase current densities and passed charges of the electrolytes up to 3 times by enhancing the electrolyte conductivity. Halide salts are ubiquitous and are typically very cheap chemicals. In general, the effect of the free-halide-anion donor can be achieved using other commercial halide salts including organic and inorganic halide salts. Accordingly, the addition of free-halide-anion donors can upgrade quasi-reversible Mg-electrolytes to fully reversible ones for practical Mg-batteries application without significant additional costs.

While a number of embodiments of the present invention have been shown and described, it will be apparent to those skilled in the art that many changes and modifications may be made without departing from the invention in its broader aspects. The appended claims, therefore, are intended to cover all such changes and modifications as they fall within the true spirit and scope of the invention.

We claim:

1. A Mg-based energy storage system having an anode comprising Mg metal, the system characterized by an electrochemical window greater than 2.8 V vs. Mg and by an electrolyte solution comprising:
    (i) an organic solvent;
    (ii) an active $Mg^{2+}$ dimer monocation concentration greater than or equal to 0.2 M, wherein the active $Mg^{2+}$ dimer monocation comprises a $Mg_2X_3$ core complexed with six solvent molecules, and wherein at least a portion of the active $Mg^{2+}$ dimer monocation concentration is a reaction product of
        a magnesium dihalide $MgX_2$, wherein X represents a halogen elemental, and
        a Lewis acid $MR_aX_{3-a}$, wherein $3 \geq a \geq 1$, M is a metal center, R is an organic ligand, and X is the halogen element; and
    (iii) an anion having a formula $MR_aX_{4-a}^-$.

2. The Mg-based energy storage system of claim 1, wherein the Lewis acid is $MRX_2$ or $MR_3$.

3. The Mg-based energy storage system of claim 1, wherein the metal center of the Lewis acid comprises a metal selected from the group consisting of B, Al, Ga, In, Fe, and combinations thereof.

4. The Mg-based energy storage system of claim 1, wherein the organic ligand is selected from the group consisting of alkyl, aryl, alkoxide, aryloxide, thiolate, amide, and combinations thereof.

5. The Mg-based energy storage system of claim 1, wherein the active $Mg^{2+}$ dimer monocation concentration is greater than or equal to 0.4 M.

6. The Mg-based energy storage system of claim 1, wherein the active $Mg^{2+}$ dimer monocation concentration is greater than or equal to 0.7 M.

7. The Mg-based energy storage system of claim 1, wherein the molar ratio of the magnesium dihalide to the Lewis acid is approximately 2:1.

8. The Mg-based energy storage system of claim 1, wherein the Lewis acid comprises $AlEtCl_2$, $AlPhCl_2$, or both, and the electrolyte solution comprises $AlEtCl_3^-$, $AlPhCl_3^{31}$, or both.

9. The Mg-based energy storage system of claim 1, wherein the electrolyte comprises $MgCl_2$.

10. The Mg-based energy storage system of claim 1, wherein the organic solvent is an ether solvent.

11. The Mg-based energy storage system of claim 1, further having a free-halide-anion donor comprising $X^-$, but not Mg, wherein the free-halide-anion donor contributes free anions of $X^-$ to the electrolyte solution.

12. The Mg-based energy storage system of claim 11, wherein the free-halide-anion donor comprises an organic salt having $X^-$.

13. The Mg-based energy storage system of claim 11, wherein the free-halide-anion donor comprises an inorganic salt having $X^-$.

14. The Mg-based energy storage system of claim 1, having a coulombic efficiency greater than 99%.

15. The Mg-based energy storage system of claim 1, further comprising a second Lewis acid, $MX_3$.

16. The Mg-based energy storage system of claim 1, wherein the magnesium dihalide is $MgCl_2$, the solvent is tetrahydrofuran, and the $Mg^{2+}$ dimer monocation is $[(\mu\text{--}Cl)_3Mg_2(THF)_6]^+$.

17. A Mg-based energy storage system having an anode comprising Mg metal, the system characterized by an electrochemical window greater than 2.8 V vs. Mg and by an electrolyte solution comprising:
   (i) an organic ether solvent;
   (ii) an active $Mg^{2+}$ dimer monocation concentration greater than or equal to 0.4 M, wherein at least a portion of the active $Mg^{2+}$ dimer monocation concentration is a reaction product of $MgCl_2$ with a Lewis acid comprising $AlEtCl_2$, $AlPhCl_2$, or both, and wherein the active $Mg^{2+}$ dimer monocation comprises a $Mg_2Cl_3$ core complexed with six organic ether solvent molecules; and
   (iii) $AlEtCl_3^-$, $AlPhCl_3^-$, or both.

18. The Mg-based energy storage system of claim 17, wherein the molar ratio of the $MgCl_2$ to the Lewis acid is approximately 2:1.

19. The Mg-based energy storage system of claim 17, wherein the electrolyte solution further comprises a salt contributing free anions of $Cl^-$ to the electrolyte solution, wherein the salt does not comprise Mg.

20. A method for improving performance of Mg-based energy storage systems having an anode comprising Mg metal and having an electrochemical window greater than 2.8 V vs. Mg, the method comprising the steps of:
   providing an electrolyte solution according to claim 1; and
   providing a free-halide-anion donor having X, but not Mg, thereby contributing free anions of $X^-$ to the electrolyte solution.

21. The method of claim 20, wherein the metal center M comprises a metal selected from the group consisting of B, Al, Ga, In, Fe, and combinations thereof.

22. The method of claim 20, wherein the organic ligand R comprises ethyl, phenyl, or both.

23. The method of claim 20, wherein said providing a free-halide-anion donor comprises providing an amount of the free-halide-anion donor sufficient to yield a Coulombic efficiency greater than 99%.

* * * * *